United States Patent [19]
Winter et al.

[11] 3,846,527
[45] Nov. 5, 1974

[54] PRODUCTION OF INORGANIC FIBERS

[75] Inventors: Gerhard Winter; Manfred Mansmann, both of Krefeld; Nikolaus Schon, Leverkusen; Hildegard Schnoring, Wuppertal-Elberfeld, all of Germany

[73] Assignee: Bayer Aktiengesellschaft, Leverkusen, Germany

[22] Filed: Apr. 25, 1972

[21] Appl. No.: 247,457

Related U.S. Application Data

[63] Continuation-in-part of Ser. No. 77,324, Oct. 1, 1970, abandoned.

[30] Foreign Application Priority Data
Oct. 17, 1969 Germany............................ 1952398

[52] U.S. Cl............................. 264/63, 264/DIG. 19
[51] Int. Cl.............................................. C04b 35/64
[58] Field of Search......................... 264/63, DIG. 19

[56] References Cited
UNITED STATES PATENTS
3,529,044  9/1970  Santangelo................... 264/DIG. 19
3,632,709  1/1972  Hayes et al.................. 254/DIG. 19
3,652,749  3/1972  Sobel et al.................... 264/DIG. 19

*Primary Examiner*—Donald J. Arnold
*Attorney, Agent, or Firm*—Burgess, Dinklage & Sprung

[57] ABSTRACT

Inorganic fibers are produced by dry-spinning a solution, sol or dispersion of one or more metal compounds which would not normally be spinnable but which is rendered spinnable by inclusion of a small amount of a linear polymeric substance. The resulting fibers are subsequently heated to convert the metal compound to the oxide, carbide or nitride and to produce oxide, carbide or nitride fibers. The linear polymeric substance is characterized by a degree of polymerization in excess of 2,000 and is dissolved in the spinning dope in a concentration of 0.001 to 5 percent by weight.

19 Claims, No Drawings

PRODUCTION OF INORGANIC FIBERS

This application is a continuation-in-part of application Ser. No. 77,324, filed Oct. 1, 1970, now abandoned.

The invention relates to producing inorganic fibers by dry-spinning a solution, sol or dispersion of inorganic material under conditions which would not normally produce fibers.

Inorganic fibers can be produced by a number of processes one of the oldest of which is the production of glass filaments by spinning a glass melt. The temperatures used in this process impose very stringent demands upon the apparatus used. For this reason, efforts have been made to spin from solutions by the conventional techniques used in the production of synthetic organic fibers.

One of the prerequisites for the process of spinning from solutions, for example aqueous systems, is the spinnability of the particular solution used which is reflected in the fact that, when a glass rod is withdrawn from a solution of this kind, the liquid is entrained by it in the form of a more or less long filament, or alternatively when a solution of this kind flows out through a nozzle a more or less long continuous liquid filament rather than a series of drops is formed. As a rule, this property is only encountered in solutions of polymeric organic substances and not in inorganic salt solutions or sols of inorganic compounds. One can easily be convinced that a solution of magnesium acetate or cerium nitrate is as impossible to spin as a silica, aluminium hydroxide or vanadium pentoxide sol. Solutions can only be spun in a very special form which has to be established through special preparation techniques.

The production of silica-containing materials by spinning from an aqueous solution is described in U.S. Pat. No. 2,969,272. Spinnability is obtained by polymerizing mixtures of silica sols and alkali metal silicates through the addition of substances with a polymerizing action such as $B_2O_3$, $Al_2O_3$ or ZnO for example, at an elevated temperature by removing water to form linear-polymeric silicate fibrils with a molecular weight above 5,000, resulting in the formation of a spinnable sol.

German Auslegeschrift No. 1,249,832 relates to a process for the production of inorganic filaments in which a metal salt solution of an aliphatic carboxylic acid is admixed with an excess of this acid, concentrated and polymerized by heat treatment in the atmosphere of this carboxylic acid to give a viscous, spinnable solution, resulting in the formation of chain-like polymers containing from 1,000 to 10,000 units per chain. The atmosphere of the carboxylic acid and the acid excess are necessary to avoid the deposition of a second insoluble phase.

U.S. Pat. No. 3,322,865 relates to a process in which aqueous inorganic metal salt solutions are concentrated up to a viscosity of from 1 to 1,000 poises for a solids content that can be as high as 50 percent, after which these aqueous inorganic metal salt solutions are spun and calcined to form the oxide. The sulfates, chlorides, oxychlorides, phosphates and nitrates of Al, Be, Cr, Mg, Th, U and Zr are mentioned as salts.

As a rule, salt solutions can only be concentrated up to a point at which the solubility product is reached. Although further concentration is possible, unstable supersaturated solutions are formed in this case. For example, a solution of $MgSO_4 \cdot 7H_2O$ saturated at 20°C contains 36.5 g of $MgSO_4$ in 100 g of $H_2O = 8.8$ percent of MgO, whilst a solution of $Al_2(SO_4)_3 \cdot 18\,H_2O$ contains 36.3 g of $Al_2(SO_4)_3 = 7.94$ percent of $Al_2O_3$ (Chemiker Kalender 1956). However, it is apparent from the Examples in the aforementioned Patent Specification that concentrations of from 25 to 38 percent of oxide must be present in order to obtain the aforementioned viscosity. This is obtained by starting with hydrolyzable salts, such as acetates or chlorides, which during concentration are converted into a sol, or by adding alkaline-reacting substances such as metal hydroxides, CaO or MgO or direct metals such as Al or Mg, in other words by using processes of the kind normally used for the production of inorganic sols in which, following concentrations, viscous sols are obtained which in special cases show the property of spinnability required for a spinning process. It is impossible to obtain spinnable solutions with pure aqueous salt solutions in the absence of the special measures referred to above.

A similar process is described in British Pat. No. 1,030,232, in which zirconium salt solutions such as acetates, lactates or oxychlorides are converted into a spinnable sol by concentration to from 40 to 48 percent oxide. In order to obtain good fibers, the sols have to be spun immediately.

In order to prepare spinnable inorganic solutions, therefore, each individual substance requires special and in some cases extremely complicated measures, for example, polymerization processes at an elevated temperature, polycondensation reactions of the kind which occur during concentration, and controlled hydrolysis reactions. They have to be carried out in different ways depending upon the type of starting material used and upon the properties of the sol to be prepared. Depending upon the particular substance used, spinnability is only obtained in a concentration range of from 24 to 48 percent, expressed as the oxide. Solutions as highly concentrated as this are unfavorable for spinning because they are difficult to degas (although the absence of gas bubbles is extremely important to the spinning process), and since preliminary filtrations are complicated on account of the high pressures involved.

In other cases there was tried to avoid the difficulties encountered in the preparation of spinnable solutions for the production of inorganic fibers by using conventional organic spinning solutions, known from the man-made fiber industry, and dissolving therein inorganic material. Such processes are described in U.S. Pat. No. 3,529,044 and French Pat. No. 1,364,238. These processes are not very satisfactory in that they can be used only for a very special selection of inorganic substances and that they need, in order to be operative, large amounts of organic fiber-forming material relative to the amount of inorganic material. These large amounts of organic polymer will ultimately have to be wasted when transforming the fibers to the inorganic fibers by burning.

It is accordingly an object to provide a simplified process for producing fibers from solutions, sols or dispersions of inorganic materials at concentrations and conditions which are easy to work with without substantial amounts of organic polymers.

This and other objects and advantages are realized in accordance with the present invention which relates to a process for the production of inorganic fibers from a spinnable liquid medium by dry spinning into an evaporative environment a solution, sol or dispersion containing one or more metal compounds in a concentration of about 5 to 60 percent by weight, expressed as oxide, and a dissolved linear polymeric substance from the group of olefin and diolefin polymers and copolymers, polyethers and polyphosphates, having a degree of polymerization above approximately 2000 in a concentration of about 0.01 to 5 percent by weight, and heating the dry-spun fibers to a temperature sufficiently high to convert said metal compound to an oxide, carbide or nitride and to produce oxide, carbide or nitride fibers.

Advantageously the spinning or extrusion temperature of the liquid medium is about 15° to 60°C. In the present context the term dispersion includes both suspension and emulsion.

The process according to the invention simplifies the production of spinnable solutions for inorganic filaments to a considerable extent. The process is applicable to a large number of materials and also enables dispersions to be spun.

A very great number of metal compounds can be used according to this invention. The term metal should be understood in the broadest sense, as it embraces also semi-metals, like B, Si, P or As. Metal compounds which are suitable for the production of inorganic fibers, are those which can be converted by heat treatment to the metal oxide as such or after solvolyzation resp. hydrolyzation, or to the metal nitride as such or after reaction with a nitrogen containing gas, or to the metal carbide as such or by reaction with carbon or a carbonizing gas.

The metal compounds may be inorganic salts, like the nitrates, sulfates, halides, oxyhalides, silicates, phosphates, borates, carbonates, or salts with organic acids, such as monocarbonic acids, di- or polycarbonic acids, oxoacids, hy-droxyacids, aminoacids or sulfonic acids and derivatives thereof. Specific examples of these organic acids are: formic acid, acetic acid, acrylic acid, benzoic acid, cinnamic acid, oxalic acid, malonic acid, adipic acid, maleic acid, fumaric acid, phthalic acid, tartaric acid, citric acid, pyruvic acid, glycolic acid, lactic acid, mandelic acid, tartronic acid, malic acid, salicylic acid, glyoxylic acid, pyroracemic acid, glycocoll, amino-triacetic acid, ethylendiamintetraacetic acid, ε-aminocapronic acid, anthranilic acid, methane-disulfonic acid, taurine, benzenesulfonic acid, sulfanilic acid.

The metal compounds equally comprise the compounds in which the metal is bound to an organic group by a bridgeing oxygene and/or nitrogen atom, such as metal alcoholates, metal β-diketo compounds as e.g., metal acetylacetonates, metal amine compounds or metal aminoalcohol compounds. Therefore the organic group may be derived for instance from methanol, ethanol, propanol, butanol, glycol, glycerol, methylamine, ethylamine, ethylendiamine, diethylentriamine, tetramethylendiamine, hexamethylentriamine, pyridine, β-β'-dipyridyl, ethanolamine, triethanolamine, chinoline, oxychinoline.

The organic group may also be attached directly to the metal by a metal-carbon bond, as in Grignard compounds and other metal-organic compounds with localized metal-carbon bonds, or by $\pi$-bonding of one metal to several C-atoms, as e.g., in cyclopentadienyl metal compounds.

According to this invention it is also possible to use sols and dispersions. Such sols, as for example hydroxide, oxide, phosphate, silicate, borate, tungstate or molybdate sols can be used in their standard commercial form. In this way it is also possible to convert suspensions and even emulsions into a spinnable form. The particle size of the dispersed particles of the suspension should be well below the diameter of the resulting fiber in order not to reduce strength of the inorganic fiber and not to clog the spinneret. Typical particle sizes range from about 5 $\mu$ down to about several hundreds of Angstrom units. The dispersed particles may be metal oxides of the following elements: Mg, Ca, rare earth metals, Ti, Zr, Hf, Th, Si, Ge, Sn, Pb, V, Nb, Ta, Cr, Mo, W, U, Mn, Fe, Co, Ni, Cu, Zn, Cd. Another group of dispersed particles are finely divided metal powders, such as Cr, Mo, W, Fe, Co, Ni, Re, the platinum group metals, Ag, and Au. Still another group of solid particles are metal nitrides and carbides and elemental carbon. Examples of suitable compounds are the carbides and nitrides of Si, B, Al, Ti, Zr, Hf, V, Nb, Ta, Cr, Mo, W. The shape of the dispersed particles can be chosen at will, but sometimes fibrous particles are advantageously used. During the spinning process fibrous particles are oriented more or less parallel to the fiber axis leading to fibers of improved strength. The fibrous particles should have diameters of about 1 $\mu$ down to about 100 A. units and length of about between 10 $\mu$ down to several hundreds of Angstrom units. Their length to diameter ratio may be as high as 1000 : 1. Examples of useful fibrous particles are the various forms of asbestos, or the $SiO_2$-pseudomorphes which are obtained by a HCl-leaching process from asbestos. Other fibrous materials are fibrous aluminum-oxide monohydrate (fibrous boehmit), needle-shaped ironoxide ($\gamma$-form), needle-shaped $\alpha$-FeOOH or whiskers, that are mono-crystalline fibers, such as SiC—, $\alpha$—$Al_2O_3$—, $Si_3N_4$— or $Na_2Ti_6O_{13}$-whiskers.

Dispersed particles should preferably be used in combination with other metal compounds in solution or as sols in order to have fibers of substantial strength. Otherwise very weak fibers are formed which are difficult to handle and which need much higher sintering temperature as in the case with other metal compounds dissolved or as sol in the liquid medium. The amount of dispersed particles in the liquid medium may be between about 0.1 to 80 percent by weight of the total amount of metal compounds, all taken as oxides.

If the liquid medium contains said dispersed particles, it is often useful to add small amounts of dispersing agents.

The addition of solid particles may be advised for imparting color to the inorganic fibers or to incorporate substances of catalytic activity. In other cases solid material may be added when the fibers are used as heat insulation material, whereby the mechanical properties are of minor importance but where the highest refractoriness and chemical inertness are desired.

Even emulsions can be used as liquid medium according to this invention. The metal compounds used are then at the temperature of the spinning solution in the liquid state and not dissolved in the solvent. In this case small amounts of emulsifier can be used in order to stabilize the emulsion. Suitable liquid metal compounds are for instance the alkoxides of polyvalent metals like boron trialkoxides (boric acid esters), silicon-tetraalkoxides (silicic acid esters), titaniumtetraalkoxides (titanium acid esters) and so on.

The spinnable liquid medium can have concentrations of these metal compounds, expressed as the oxide, of from about 5 to 60 percent by weight, preferably from about 5 to 40 percent by weight. In this way, it is possible in many cases to operate below the saturation limit of the particular systems used, so that the danger of crystallization is safely avoided, in contrast to other known processes.

A liquid medium which comprises only one or more of the before mentioned metal compounds in said concentration range, is not spinnable. If it is extruded from a spinneret there cannot be formed filaments or fibers but only droplets.

By virtue of this invention it is possible to obtain a very wide variety of inorganic filaments, including oxide filaments of the metals Be, Mg, Ca, Sr, Ba, rare earths, Th, U, Ti, Zr, Hf, V, Nb, Ta, Cr, Mo, W, Mn, Fe, Co, Ni, Zn, B, Al, Ga, Si, Ge, Sn, filaments consisting of mixtures or compounds of the aforementioned oxides and also those additionally containing other elements such as Li, Na, K, Rb, Cs, Re, Ru, Os, Ir, Pt, Rh, Pd, Cu, Ag, Au, Cd, In, Tl, Pb, P, As, Sb, Bi, S, SE, or Te. It is also possible, however, to produce filaments consisting of carbides or nitrides of the aforementioned elements. In the case of carbide filaments, carbon or carbon-containing materials such as for example carbon black, graphite or soluble organic compounds decomposing into carbon, can be co-spun as reagents. Similarly, it is possible to obtain nitride filaments by cospinning nitrogen-containing compounds. However, the reaction to form carbide and nitrides can also be carried out by reacting the oxide filaments with carbon- or nitrogen-containing gas atmospheres. It is preferred to produce inorganic filaments based on the oxides, nitrides and/or carbides of Be, Mg, Ca, Ti, Zr, B, Al, P, and/or Si.

The solution, sol or dispersion containing one or more of the aforementioned metal compounds can be made spinnable according to our extensive investigations. By dissolving a linear polymeric substance of high molecular weight or high degree of polymerization from the group of olefin and diolefin polymers and copolymers, polyethers and polyphosphates. In contrast to dry spinning processes for the production of inorganic fibers with an organic carrier, where the amount of the fiber forming polymer has to be in the usual range between 15 and 45 percent by weight of the spinning dope (Man-made Fibers, Science and Technology, vol. I, editors: H. F. Mark, S. M. Atlas, E. Cernia; Interscience Publ. 1967, p. 139), the present invention makes it possible to use only small amount of a linear polymeric substance to impart excellent spinnability to the solution, sol or dispersion of the metal compounds.

Solutions of linear-polymeric substances have long been used in spinning processes of the kind used in the synthetic fiber industry to produce synthetic fibers. These solutions also show the property of spinnability, although the molecular weights and degrees of polymerization of the substances used in these processes are nowhere near as high as they are in the substances used in accordance with the invention. Adequate spinnability is only obtained in the concentration ranges from 15 to 45 percent. For example, a 25 percent solution of a polyacrylonitrile with a molecular weight of 35,000 to 50,000, corresponding to a degree of polymerization of from 660 to 950, is spun in dimethyl formamide to produce polyacrylonitrile fibers (Ullmans Encyklopädie der technischen Chemie, vol. 7 [1956]). Other examples showing similar values for other polymers (cellulose acetate, PVC, PVA) are given in Man-Made Fibers, vol. I, p. 164). However, if substances of this kind are converted into 0.001 to 5 percent solutions in a suitable solvent, these solutions can no longer be spun. It is only a series of droplets, rather than a continuous filament, that is formed as they emerge from a spinneret.

The linear polymeric substances according to the present invention are characterized by their degree of polymerization and molecular weight. We have discovered that only above a minimum degree of polymerization of about 2,000 solutions of linear polymeric substances with concentrations of less than about 5 percent by weight down to about 0.001 percent by weight in the spinning dope show the property of imparting spinnability to a liquid medium.

In the present context the meaning of degree of polymerization shall be the number of individual chemical molecular entities which are reacted to give the polymer substance. In this sense in copolymers the different monomer units are counted equally in the polymer, or, as another example, in nylon 6,6 the number of the hexamethylendiamine molecules and the number of adipic acid molecules are counted both for the degree of polymerization.

Linear - in this context - shall mean that the polymeric substance is essentially chain-like, having either relative to the length of the main chain only small side-chains or only a very small number of branching elements in its chain.

We found that the higher the degree of polymerization the smaller can be the concentration in a solvent to produce spinnable liquids. Therefore concentrations below 2 percent by weight down to 0.01 percent by weight of the linear polymeric substances with degrees of polymerization of about 5,000 and above are preferred. The degree of polymerization may be as high as 200,000 or higher and is in praxi confined only by the availability and the solubility of the highest polymerized products.

These high polymers which are used according to this invention may not necessarily be fiber-forming by itself when spun alone. Especially in the case of very high polymers there is too little substance in the liquid to produce a solid fiber when spun. But they all are able to give uninterrupted liquid filaments up to several meter length, when extruded through a spinneret. As a matter of fact, as will be described later, this ability to form liquid filaments of substantial length in diluted solution has been found to be the criterion according to which the linear polymeric substance can be chosen. Surprisingly it was discovered that upon dissolving said linear polymeric substances in solutions, sols or dispersions of metal compounds in said concentrations those liquid media become spinnable. By extruding the liquid medium through a spinneret into an evaporative environment, say a spinning column, the liquid filament is transformed to a solid filament consisting mainly of the metal compound contained in the liquid medium. In this way spinnability has been transferred to the otherwise unspinnable solutions, sols or dispersions of one or more metal compounds.

The linear polymeric substances can be inorganic or organic as long as their degree of polymerization is above about 2,000. On the other hand, the type of solvent is not limited and may be chosen at will. The solvent can be chosen according to the solubility of the components of the spinning dope. Often water will be used. But equally well suited are organic solvents like alcohols, chlorinated alkanes, acetone, dimethylformamid, dimethylsulfoxide and so on.

The operability of the process for the production of inorganic fibers according to this invention has been demonstrated with a great number of different type polymers. These polymers belong to the group of olefin and diolefin polymers and copolymers, polyethers and polyphosphates. These polymers may also be substituted and/or copolymerized products.

By contrast, it was not possible to obtain spinnability by using polymeric substances with a degree of polymerization of below 2,000 such as present in most standard commercial products, and in the concentration range of 0.001 to 5 percent by weight. If the polymeric substances did not show chain-like structure, e.g. with a substantial degree of branching as in three dimensionally polymerized products, spinnability of the liquid medium could not be achieved, even with degree of polymerization of above 2,000.

Specific examples of linear polymeric substances of high degree of polymerization useful for the production of inorganic fibers according to this invention are the following: polystyrene, polyisobutylene, polyvinylacetate, polyvinylalcohol, polyvinylmethylether, polymethyl methacrylate, copolymers of styrene or methylvinylether and maleic acid and their salts, polyacrylamide, polymethacrylamide, polyacrylic acid and its salts, polymethacrylic acid and its salts, copolymers of acrylamide, acrylonitrile or methacrylamide and acrylic acid or methacrylic acid and their salts, polybutadiene, polybutene-1, polyisoprene. From the polyethers the polylower alkylene oxides are preferred, e.g., the polymerization products of ethylene oxide, propylene oxide and butylene oxide and copolymers thereof. Suitable polyphosphates are the Kurrol salts.

The spinnability of high polymer solutions in the concentrations of the kind employed in the process according to the invention is ultimately governed by the degree of polymerization of the substances used. To illustrate this, the circumstances prevailing in aqueous and organic media are explained in a few examples. Spinnability is measured by a technique which is described in the literature and which is based on the process normally used for dry spinning. The liquid to be investigated is extruded under pressure from a spinneret and the length of the uninterrupted liquid filament measured up to a point where it breaks up into individual droplets (Kolloid Zeitschrift 61 [1932] page 258). For the purposes of the present measurements, the solutions were extruded under a pressure of 0.5 atms. gauge from a spinneret 400 microns in diameter and 17 mm in length.

2 percent aqueous solutions of polyethylene oxide, i.e. polyethylene glycol, can reach different levels of spinnability depending on the molecular weight and on the degree of polymerization. The spinnability of a solution of a polyethylene oxide A with a degree of polymerization DP of 5,450 only reaches 30 cm, polyethylene oxide B (DP = 17,000) 130 cm, polyethylene oxide C (DP = 68,200) 225 cm whilst the spinnability of a polyethylene oxide D with DP = 136,400 is already far in excess of 300 cm. At a degree of polymerization of 2,000 the limiting viscosity number $[\eta]$ of polyethylene oxide is 0.76. In order more precisely to characterize the substances, their limiting viscosity number $[\eta]$ measured in $H_2O$ at 35° C under a shear stress of $\tau = 12.5$ $dyn/cm^2$ is also quoted in Table 1.

Table 1

| Substance | Limiting viscosity number $[\eta]$, 35°C, $H_2O$ $\tau = 12.5$, $dyn/cm^2$ | Degree of polymerization DP | Spinnability of 2 % solutions cm |
| --- | --- | --- | --- |
| polyethylene oxide A | 2.0 | 5,450 | 30 |
| polyethylene oxide B | 4.81 | 17,000 | 130 |
| polyethylene oxide C | 7.1 | 68,200 | 225 |
| polyethylene oxide D | 9.15 | 136,400 | more than 300 |

The limiting viscosity number also known as the intrinsic viscosity is defind as follows:

$$[\eta] = c^{lim}o \ln \eta r/c$$

$\eta r$ = relat. viscosity $\eta/\eta o$; $\eta$ = viscosity of the solution;

$\eta o$ = viscosity of the solvent; $c$ = concentration in g/100 ml.

For a degree of polymerization of 136,400 ($[\eta] = 9.15$), a 1.5 percent aqueous polyethylene oxide solution shows a spinnability of as high as 300 cm. If 1.5 percent of this polyethylene oxide is present in a solution of an inorganic or organic salt, in a sol or in a dispersion, these too have a spinnability of several meters. The spinnability of the solution of the high molecular weight polyethylene oxide has been transferred to the particular solutions because the salt solutions, sol, emulsions or dispersions used are not spinnable on their own. If it is desired to obtain similarly high values of spinnability with a polyethylene oxide with a lower degree of polymerization, its concentration must be correspondingly higher. For example, a spinnability of 300 cm is also reached by a polyethylene oxide with a degree of polymerization of 6,800 providing the aqueous solution contains 2.5 percent of the polyethylene oxide by weight.

Similar circumstances also prevail with aqueous solutions of Kurrol salts, for example with a compound of the composition $[(K,Na)PO_3]_{DP}$ (cf. Table 2). A 0.5 percent by weight aqueous solution of this salt with a $\ln \eta\ r/c$ value of 28.13 and a degree of polymerization of 4,650 has a spinnability of 30 cm, whilst a product with a degree of polymerization of 8,000 and a $\ln \eta\ r/c$ value of 39.13 in the form of a 0.5 percent solution shows a spinnability of 300 cm. Preferably the viscosity exceeds about 15. The inherent viscosity ln $\eta$ r/c was measured on 0.05 percent aqueous solutions at 25° C, pH = 7 containing 0.1 percent of NaCl under a shear stress of $\tau = 0.98$ dyn/cm², c being the concentration in grams per 100 ml of the solvent.

Table 2

| Substance | ln $\eta$ r/c; .05 % solution, 25°C, pH = 7; + 0.1% NaCl, $\tau$ = 0.98 dyn/cm² | Degree of polymerization DP | Spinnability 0.5 % solution in H₂O cm |
|---|---|---|---|
| [(K,Na)PO₃]$_{DP}$ | 28.13 | 4,650 | 30 |
| [(K,Na)PO₃]$_{DP}$ | 39.13 | 8,000 | 300 |

Polyacrylamides and acrylamide/acrylic acid copolymers and their salts are also suitable for aqueous systems. For example, an acrylamide/acrylic acid copolymer of which 85 percent consists of acrylamide and which has a degree of polymerization of 14,080, in the form of a 1.7 percent aqueous solution has a spinnability of 300 cm. A product of relatively high molecular weight with a degree of polymerization of 70 400 containing 60 percent of acrylamide of a 0.25 percent solution in water has a spinnability of as much as 300 cm. 0.1 percent shows a spinnability of 130 cm, 0.05 percent 60 cm and 0.01 percent 18 cm. The inherent viscosity ln $\eta$ r/c (measured in H₂O, 25° C, pH = 7, 0.05 percent solution with a 0.1 percent NaCl at $\tau = 0.98$ dyn/cm²) of this product amounts to 35. The spinnability is further improved by the addition of a metal compound. For example, a solution of 11.5 percent MgO in the form of the magnesiumacetate and 0.01 percent of the above acrylic acid/acrylamide copolymer produces a spinnability of 100 cm. Using the same MgO concentration, the spinnability rises to 300 cm with 0.025 percent of the copolymer. The ratio of acrylamide to acrylic acid in the copolymers can assume any value between 0:1 and 1:0. A copolymer containing 2.5 percent of acrylamide (97.5 percent of acrylic acid) in the form of a 0.8 percent solution also has a spinnability of 210 cm. Equally good spinnability is obtained in cases where the carboxyl groups of the copolymer are neutralized by salt formation. Li, Na, K, NH₄ salts or substituted ammonium salts may be used as the salts. At an inherent viscosity as low as about 4 it is still possible to obtain satisfactory filaments.

A 3 percent solution of polystyrene in CH₂Cl₂ becomes spinnable at polymerization degrees above approximately 10,000 and spinnability increases with the degree of polymerization. In the case of particularly high molecular weight products such as polystryene F for example with a degree of polymerization of 125,000, a spinnability of at least 300 cm can actually be obtained with a 0.15 percent solution in CH₂Cl₂ (cf. Table 3).

Table 3

| Substance | | Degree of polymerization | Concentration % by weight in CH₂Cl₂ | Spinnability cm |
|---|---|---|---|---|
| polystyrene | A | 1,038 | 3 | 1 |
| do. | B | 20,200 | 3 | 10 |
| do. | C | 25,000 | 3 | 20 |
| do. | D | 27,900 | 3 | 50 |
| do. | E | 34,600 | 3 | 110 |
| do. | F | 125,000 | 0.15 | 300 |

Similar circumstances also prevail with other high polymers such as for example solutions of polyisobutylene in trichlorethylene (Table 4). Preferably the DP exceeds about 5,000.

Table 4

| Substance | | Degree of polymerization | Concentration % by weight in trichlorethylene | Spinnability cm |
|---|---|---|---|---|
| polyisobutylene | A | 6,900 | 3 | 4 |
| do. | B | 23,600 | 3 | 20 |
| do. | C | 49,000 | 3 | 60 |
| do. | D | 85,500 | 1.5 | 300 |

A 3 percent solution of a polymethyl methacrylate with a degree of polymerization of 3,600 in CH₂Cl₂ shows a spinnability of 10 cm, whilst a 2 percent solution in CH₂Cl₂ shows a spinnability of as high as 300 cm for a degree of polymerization of 15,000. 3 percent solutions of polyisoprene for example in toluene or trichlorethylene are also spinnable (degree of polymerization DP = 25,000); preferably the DP exceeds about 10,000.

Polyethylene oxide which is spinnable in aqueous solution also shows this property in organic solvents, for example in CH₂Cl₂. In this case, too, spinnability increases with the degree of polymerization. The effectiveness in CH₂Cl₂ is even higher than in water. A polyethylene oxide with a degree of polymerization of 6,800 reaches a spinnability of as high as 300 cm in the form of only a 0.2 percent solution.

The limits within which spinnability occurs can be displaced somewhat depending both upon the nature of the high polymer and upon the type of solvent used. In either case, however, a spinnability in solutions of very low concentration which can be transferred to salt solutions, sols or dispersions is observed in substances of this kind in the range of high limiting viscosities number [$\eta$] or high degrees of polymerization. By contrast, it was not possible to obtain spinnability by using polymeric substances with a low degree of polymerization such as are present in most standard commercial products, in the form of dilute solutions, or by using a polyethylene oxide with a degree of polymerization below 2,000.

To prepare the spinning solutions, the salt solution, the sol or the dispersion is admixed with a concentrated solution of the high polymer until there is evidence of adequate spinnability which is achieved in the range of from about 0.01 to 2 percent of polymer, based on the total solution. The salts may also be directly dissolved in the solution of the high polymer. The opposite procedure — dissolving the linear polymeric substance in the metal compound solution — is also suited. The concentration of the metal compound and hence the oxide content can be varied within wide limits.

In the case of a high oxide content, a relatively low high polymer concentration is required and vice versa. However, the quantity is governed by the properties of the solution. As a rule, fairly viscous solutions require less high polymer than thinly liquid solutions.

The spinning solutions obtained in this way show a number of desirable properties. In addition to their outstanding spinning properties, another very important and desirable property is the relatively low viscosity of the solutions and hence their better handling properties. These solutions can have viscosities of from 1 to 100 poises, preferably from 1 to 10 poises, in other words they can have viscosities lower than those normally required for spinning processes. For this reason, the spinning solutions are easy to filter, easy to degas and can also be pumped through pipes without any difficulties.

Spinning can be carried out by wet and dry spinning techniques. In wet spinning, the filaments are spun into a suitable precipitation bath and tempered on completion of coagulation. Dry spinning can be carried out in a centrifugal spinning machine. In this case, the filaments are thrown from the periphery of a rotating spinning vessel, after which they pass through a drying zone and are then taken up. This method is suitable, for example, for the production of staple fibers which are then heat treated either continuously or in batches. However, it is preferred to apply a conventional dry spinning process in which the solutions are spun at a temperature of about 15°C to about 60°C from a spinning head provided with several orifices, the filaments issuing from the spinning head pass through a spinning column which can be heated to a temperature of up to several hundred degrees and in which they are drawn to a diameter of from about 50 to 1 microns and can then be wound up. A stream of drying gas is simultaneously fed through the spinning column. The temperature of the spinning column and that of the drying gas is depended of the solvent used which has to be evaporated from the filament during its passage through the spinning column. This dry-spinning method is known in the art and described e.g. in Man-Made Fibers, vol. I, p. 145 ff.

The wound up fibers have to be heated in order to convert the metal compounds present in the fiber to the oxide, nitride or carbide form. This can be done in a separate step, whereby the fibers are heated to the temperature necessary for the transformation into the oxide, nitride or carbide form and for any desired sintering effect. These measures are known in the art and are described in U.S. Pat. 3,322,865. However, the filaments can also be passed through the high temperature zone immediately on leaving the spinning column. The temperature at the inlet end of the high temperature zone is from about 300 to 400°C. The final temperature is governed largely by the sintering behavior and melting point of the compound formed. In the case of high-melting substances such as $ZrO_2$ or $ThO_2$ for example it must be correspondingly higher than it is in the case of lower melting compounds such as for example $TiO_2$ and $SnO_2$ where a temperature of from about 800° to 1100°C is sufficient.

While the filaments are passing through the spinning column, most of the solvent is removed. The initially thinly liquid filament is thus concentrated and is converted through a highly viscous state into a gel or coagulum. In this state, the filaments can still contain from about 10 to 40 percent of the solvent.

Gelation of the filament can be accelerated by adding to the spinning solution a gas which has a solubilizing effect on the substance to be spun such as for example $SO_2$ on $AlPO_4$ or $Al(OH)_3$. After spinning, however, the gas quickly leaves the filament, thereby promoting gelation accompanied by reformation of the substance which is now again insoluble. Other gases with a solubilizing effect such as $CO_2$, $NO_2$, $NH_3$, $H_2S$, $HF$, $HCl$, $HBr$ or $HI$ can be similarly used.

In other cases, sol-gel conversion of the filament can be accelerated by adjusting the pH. For example, an ammoniacal solution of a silica sol to which polyethylene oxide has been added is highly fluid, whilst in the neutral range the same solution forms a visco-elastic gel. When the ammoniacal solution is spun, the pH value of the filament is very quickly lowered through evaporating $NH_3$ so that the filament gels. In the spinning of compounds which readily decompose under heat such as acetates, oxalates, organic salts, nitrates, nitrites, carbonates and sulphites, $NH_3$ is preferably fed into the spinning column to promote quick drying, solidification and in some cases also decomposition into the hydroxide or oxide.

Any solvent residues left in the filament and any volatile constituents are eliminated during the subsequent heat treatment. Organic constituents can be removed by oxidation with air. By suitably selecting the sintering conditions, it is possible to obtain on the one hand porous filaments, for example for catalysts and catalyst supports, or on the other hand non-porous filaments, for example for reinforcing purposes.

The invention is illustrated in the following examples wherein all parts are by weight unless otherwise expressed. In all examples spinnable solutions were used which had a spinnability of more than 200 cm. None of the metal compounds could be dry spun when present as solution, sol or dispersion without addition of a linear polymeric substance.

Example 1 $TiO_2$ fibers 258 g of $TiCl_4$ were added dropwise with stirring over one hour to a flask provided with a reflux cooler and containing 200 g of water. At the start slight precipitation of titanium dioxide aquate occurred but this dissolved again in the course of the dropwise addition to give a clear solution. Thereafter 20.8 g of 96 percent sulfuric acid were added and the mixture concentrated for three hours at 50°C and a pressure of 20 mm Hg in the rotary evaporator. The $TiO_2$ content of this solution amounted to 34.9 percent. To this solution there were added 34.5 g of a 2 percent aqueous polyethylene oxide solution (polymerization degree approx. 100 000) and 17.5 g of water and homogenized for 2 hours by slow stirring.

The spinning solution with a content of 30.0 percent $TiO_2$ and 0.19 percent polyethylene oxide was spun in the usual way to form continuous fibers after the dry spinning process. For this purpose it was extruded through a nozzle with a diameter of 0.4 mm into a spinning column (2 m long and 6 cm wide) which had been heated to 100°C. The column was rinsed with 2 m³ of air/hour in the same direction of movement as the fibers. The fibers were wound onto a rotating cylinder at the shaft exit at a speed of 170 m/min. The easily manageable fibers were then heated at a heating rate of 100°C per hour to 400° and at a heating rate of 200°C/hour to 1000°C in the muffle furnace in the presence of air. On attaining the end temperature the fibers were rapidly removed from the furnace. The resulting fibers were white and had a tensile strength of 13 kp/mm$^2$ and a Young's modulus of 12 000 kp/mm$^2$.

Example 2 TiO$_2$ fibers

Pure TiCl$_4$ was introduced dropwise into water until a solution containing 36.8 percent of TiO$_2$ was formed. 80 g of this solution were admixed with 3.92 g of a 1 percent aqueous polyethylene oxide solution ($[\eta] = 7.1$) and 14.23 g of H$_2$O. The completed spinning solution which contained 30 percent of TiO$_2$ and 0.04 percent of polyethylene oxide was spun as just described and the spun filaments converted by calcination into TiO$_2$ fibers.

Example 3 MgO fibers 100 g of Mg(C$_2$H$_3$O$_2$)$_2$.4H$_2$O were dissolved under heat in 125 g of a 2 percent aqueous solution of an acrylic acid/acrylamide copolymer (in $\eta$ r/c = 35.0) containing 60 percent of acrylamide. A spinnable solution containing 8.5 percent of MgO and 1.14 percent of the acrylic acid/acrylamide copolymer was formed. The solution lent itself to gravity spinning at atmospheric pressure from a spinning vessel having orifices 400 microns in diameter. The filaments were passed through a column which was heated to 200° C, with dry air containing ammonia flowing therethrough, and then collected. The filaments collected were then heated to 300° C in a stream of NH$_3$ and then to 2,000° C in air, resulting in the formation of white polycrystalline MgO fibers.

Example 4 CeO$_2$ fibers 172 g of Ce(NO$_3$)$_3$.6H$_2$O, 37.3 g of H$_2$O and 40.7 g of a 2.7 percent polyethylene oxide solution ($[\eta] = 9.15$) in water were stirred to form a clear solution. The spinning solution which contains 0.44 percent of polyethylene oxide and 26.0 percent of Ce$_2$O$_3$, was spun as described in Example 3, the filaments were heated to 800° C in a stream of ammonia and then to 1,100° C in a stream of nitrogen and thus converted into CeO$_2$ fibers.

Example 5 9 Al$_2$O$_3$.2 B$_2$O$_3$ fibers 24.75 g of H$_3$BO$_3$ were dissolved in 500 ml of H$_2$O and mixed with a solution of 195 g Al$_2$(OH)$_5$Cl.3 H$_2$O in 200 ml of H$_2$O. Thereafter the solution was adjusted to a content of 20.4 percent by weight of 9 Al$_2$O$_3$.2 B$_2$O$_3$ by evaporation. 63.5 g of this solution were mixed with 6.5 g of H$_2$O and 30 g of a 1 percent by weight aqueous solution of polyethylene oxide ($[\eta] = 7.1$) thereby obtaining a spinning solution containing 13 % by weight of 9 Al$_2$O$_3$.2 B$_2$O$_3$ and 0.3 percent by weight of polyethylene oxide. The filaments obtained from this solution were converted by calcination in air for 2 hours at a temperature of 1000° C to fibers having the following composition: 9 Al$_2$O$_3$.2 B$_2$O$_3$.

Example 6 Al$_2$O$_3$ fibers

The solution of an aluminum salt of the composition Al$_4$(C$_2$O$_4$)$_3$(HCOO)$_6$ with an Al$_2$O$_3$ content of 14.4 percent was prepared from 54 g of aluminum amalgamated with a little HgCl$_2$, 189 g of H$_2$C$_2$O$_4$.2 H$_2$O, 138 g of HCOOH and 334 g of H$_2$O by 5 hours' heating under reflux. To produce the spinning solution, a polyethylene oxide with the degree of polymerization of about 13 600 was used. 270 g of this Al$_2$O$_3$ solution were added to a suspension of 1.8 g of polyethylene oxide in 15 g of methanol and dissolved by 7 hours' stirring to give a clear, homogeneous spinning solution with 13.7 percent of Al$_2$O$_3$, 0.63 percent of polyethylene oxide and 5.2 percent of methanol.

The solution was very easily spinnable in spite its low viscosity of only 1.5 poise. Under the same spinning conditions as described in Example 1, firm, bright fibers could be spun which were converted into white, bright, flexible Al$_2$O$_3$ fibers by heating in air to 1100°C.

Example 7 Al$_2$O$_3$ fibers 54 g of freshy amalgamated aluminum sheet were dissolved in 276.2 g of formic acid which was diluted with 1 liter of water. The solution was concentrated in vacuo by means of a rotary evaporator to a concentration of 19.3 percent of Al$_2$O$_3$. 85.3 g of this solution were then mixed with 51.2 g of a 2 percent aqueous polyethylene oxide solution, filtered and degased and, in this way, a spinning solution with 12.1 percent of Al$_2$O$_3$ and 0.75 percent of polyethylene oxide was obtained. The polyethylene oxide employed had a degree of polymerization of 136 400 and was defined by the liniting viscosity $[\eta] = 9.15$ measured in H$_2$O at 35°C at a shearing stress ($\tau = 12.5$ dyn/cm$^2$). The finished spinning solution (viscosity: 3 poises) was filled into a spinning vessel which was provided with nozzles having a diameter of 300 microns and spun in a shaft heated to 100°C through which dry air flowed. The fibrous spun material was collected and heated in air at a heating rate of 6°/min. to 1100°C.

The resulting white fibers showed a tensile strength of 28 kp/mm$^2$ and a Young's modulus of 5800 kp/mm$^2$. The porosity was 0.11 cm$^3$/g. The radiographic investigation revealed that the fibers consisted of a mixture of $\alpha$—Al$_2$O$_3$, $\gamma$—Al$_2$O$_3$ and $\delta$—Al$_2$O$_3$.

Example 8 Al$_2$O$_3$ fibers 54 g of aluminum were dissolved in 450 g of tartaric acid dissolved in 1,000 g water. The resulting solution was filtered and concentrated to a slightly viscous liquid with an Al$_2$O$_3$—content of 12.4 percent by weight. 57.2 g of this solution were mixed with 42.8 g of an aqueous solution containing 2.1 percent by weight of a polyethylene oxide with a degree of polymerization of 136 000. The resulting spinning solution had a viscosity of 4.2 Poise, an Al$_2$O$_3$-content of 7.1 percent by weight and a polyethylene oxide content of 0.9 percent. It was dry spun under a pressure of 0.5 atmospheres at room temperature from a spinning vessel with one orifice into a spinning shaft of a length of 3 meters which was rinsed with dry air and heated to 120°C. The spun fibers which had a diameter of about 20 – 30 microns were wound on a rotating drum. The fibers were then heated in air to 900°C in 100 minutes and converted into Al$_2$O$_3$ fibers.

Example 9 Al$_2$O$_3$ fibers 54 g of shavings from an aluminum sheet were added to 20 g of a 5 percent HgCl$_2$ solution as well as 200 g of distilled water and left to stand for 15 minutes.

Thereafter, 210 g of formic acid, 105 g of citric acid monohydrate and 97 g of distilled water were added. The reaction mixture was kept under reflux, until the aluminum was completely dissolved. After the reaction was finished, the solution was filtered and its $Al_2O_3$ content was determined as being 15.41 percent.

To 168.5 g of this aluminumformiate citrate solution 0.8 g of polyethylene oxide with a degree of polymerization of 100 000 and 31 g of water were added and then stirred to form a spinning solution which contained 13.0 percent of $Al_2O_3$ and 0.4 percent of polyethylene oxide. The spinning solution was passed under pressure through a glass frit G 1 and spun at 25°C through a nozzle 200 $\mu$ in diameter to gel fibers. The temperature in the spinning shaft was 100°C at the top and 180°C at the bottom. The fibers were wound up at a speed of 155 m/min.

Finally, the gel fibers were converted as in Example 6 into firm, bright $Al_2O_3$ fibers.

Example 10 MgO.5 $Al_2O_3$ fibers 13.5 g of aluminum amalgamated with $HgCl_2$ were dissolved in 114 g of glycollic acid and 600 g of water at 75°C. In the same way, 13.5 g of Al were dissolved in 65 g of formic acid and 300 g of water. Both solutions were mixed and MgO dissolved therein up to a mol ratio of Mg:Al = 1 : 10. After concentrating the solution at 50°C in the vacuum evaporator up to an oxide content of 12.0 percent it was processed to a solution of good spinnability by dissolving 0.6 percent of solid polyethylene oxide with a degree of polymerization of 100 000. As described in Example 1, the solution was spun to easily manageable, bright continuous fibers. To convert into an oxide these fibers were heated in air to 1,140°C at a heating rate of 6°/min., white, bright, flexible fibers being obtained.

Example 11 $Al_2O_3$ fibers containing TiN 4.75 g of TiN in the form of a fine powder which contained primary particles of about 0.03 to 0.04 microns in diameter were dispersed into an aluminumtriformiate solution with an $Al_2O_3$-content of 7.42 percent by weight. The dispersion was concentrated to 82.7 g in a rotating evaporator. This concentrated dispersion was mixed with 33.3 g of a 2.44 percent polyethylene oxide solution in water (degree of polymerization 136 000). The resulting spinnable dispersion contained 12.3 percent $Al_2O_3$ dissolved as aluminumformiate, 4.1 percent TiN dispersed and 0.7 percent polyethylene oxide in solution. The solution was spun to fine fibers as described in Example 7. The fibers were heated under nitrogen with 6°C/min. to 1100°C and converted into $Al_2O_3$ fibers which contained dispersed particles of TiN.

Example 12 $Al_2O_3$ fibers containing fibrous boehmit

Part of an aluminum hydroxide chloride solution with 26.6 percent of $Al_2O_3$ and an Al : Cl mol ratio of 1.8 : 1 was diluted with water to an $Al_2O_3$ content of 2.9 percent. 250 ml of this solution were heated for 3 hours at 200°C and 16 atmospheres gauge pressure in the autoclave, a fibrous boehmit slurry being produced. The small boehmit fibers measured approximately 100 × 100 × 5000 A. 4.2 g of the fibrous boehmit slurry were added to 300 g of the initial solution with 26.6 percent of $Al_2O_3$. A suspension of 1.0 g of polyethylene oxide (degree of polymerization 136 000) in 3.5 g of methanol were stirred into the sol-like solution and homogenized for 10 hours whilst stirring. The excellently spinnable suspension contained 25.8 percent of $Al_2O_3$, 0.04 percent of fibrous boehmit and 0.32 percent of polyethylene oxide. Its viscosity was determined as being 2.5 poises. As described in Example 8, the suspension was spun to bright, firm fibers. The fibers were heated in air to 550°C at a heating rate of 5°/min. and kept at this temperature for 4 hours. Flexible, grey-colored fibers were obtained.

Example 13 $SiO_2$ fibers containing $TiO_2$ 20.0 g of $TiO_2$ (rutile pigment, range of particle size 0.1 - 0.5 $\mu$, most frequent diameter 0.214 $\mu$) were dispersed with a high-speed mixer in 208 g of silicic acid tetraethyl ester. 30.0 g of methanol, 4 drops of concentrated hydrochloric acid and 68.7 g of a 2.48 percent aqueous polyethylene oxide solution (degree of polymerization 136 400) were added to 114 g of the suspension and the silicic acid ester hydrolyzed by slight warming of the mixture whilst stirring. Thereafter, the suspension was pressed out at 25°C from a nozzle 0.4 mm in diameter into a spinning column which was heated to 120°C and rinsed with air. The filaments were wound onto a rotating cylinder at the shaft exit at a speed of 70 m/min. Thereafter the fibers were heated in the presence of air at a heating rate of 6°C/min. to 840°C. The fibers had a tensile strength of 33 kp/mm$^2$ and Young's modulus of 5830 kp/mm$^2$.

Example 14 $Al_2O_3$ fibers 50 g of a standard commercial aluminum hydroxide gel (so-called DH sol, a product of Messrs. Giulini) were dispersed in 100 g of methanol, a reduction in weight to 146 g occurring through evaporation of the dispersent. 50 g of this dispersion were admixed with a 2 % solution of polyethylene oxide ($[\eta] = 9.15$) in methanol, giving a spinnable dispersion containing 6.0 percent of $Al_2O_3$ and 1 percent of polyethylene oxide. The dispersion was spun and the filaments converted by calcination into $Al_2O_3$ filaments.

Example 15 $SiO_2$ fibers containing carbon black 100 g of 30 percent $SiO_2$ sol and 78.1 g of a 2 percent polyethylene oxide solution ($[\eta] = 9.15$) in water were added to 45 g of an aqueous carbon black dispersion containing 40 percent of carbon, and adjusted to a pH value of 10.0 through the introduction of $NH_3$. The spinning solution thus obtained contained 13.5 percent of $SiO_2$, 8.1 percent of carbon in the form of a carbon black dispersion and 0.7 percent of polyethylene oxide. The spinning solution was spun and then tempered at 900° C to give black $SiO_2$ fibers containing carbon black which were converted into SiC by calcination under inert conditions.

Example 16 Boron-containing $Al_2O_3$ fibers

A spinnable emulsion was prepared from 3.2 g of boric acid tri-2-ethyl hexyl ester, 8.4 g of water, 0.5 g of dinaphthyl methane sulfonate and 1.3 g of ammonium lignin sulfonate as emulsification aid following the addition of 4.5 g of 2 % aqueous polyethylene oxide solution ($[\eta] = 9.15$) and 12.2 g of aqueous 8.5 % aluminum oxalate solution. The filaments obtained from this emulsion were converted by calcination in air into $Al_2O_3$ fibers containing boron oxide whose composition was as follows: $Al_2O_3.0.39 B_2O_3$.

Example 17 TiO₂ fibers 100 g of TiCl$_4$ were added under heat to 100 g of ethanol. 100 g of a warm 0.3 percent solution of polyethylene oxide ($[\eta] = 9.15$) in ethanol were added to 50 g of this ethanolic TiCl$_4$ solution and 70 g of excess ethanol distilled off in vacuo. The remaining spinning solution contained TiCl$_4$ in an amount corresponding to 13.1 percent of TiO$_2$ and 0.38 percent of polyethylene oxide. It was spun in a shaft heated to 100° C. through which air flows and the resulting filaments calcined in air to form TiO$_2$ fibers. Some of the fibers were converted into titanium carbide by reaction in a methane gas atmosphere at 1,500° C.

Example 18 TiO₂ fibers

A polycondensed titanium ester of the composition Ti$_{10}$O$_9$ (OC$_4$H$_9$)$_{22}$ was prepared from titanium tetrabutylate by hydrolytic condensation. 20 g of this polymeric butyl titanate were admixed with 60 g of a 1 percent solution of a polystyrene with a degree of polymerization of 125,000 in CH$_2$Cl$_2$ and a spinnable solution containing 25 percent of polymeric butyl titanate and 0.75 percent of polystyrene obtained. The spun filaments were converted by calcination into TiO$_2$.

Example 19 TiO₂ fibers 20 g of the polymeric butyl titanate of Example 18 were converted with 60 g of 2 percent polyisobutylene solution (degree of polymerization 85,500) in trichlorethylene into a spinning solution containing 25 percent of polymeric butyl titanate and 1.5 percent of polyisobutylene, the resulting solution spun and the filaments thus obtained calcined to form TiO$_2$.

Example 20 TiO₂ fibers 20 g of the polymeric butyl titanate of Example 18 were mixed with 60 g of a 4.7 % solution of a polymethyl methacrylate (degree of polymerization 15,000) in CH$_2$Cl$_2$. The spinning solution contained 25 percent of polymeric butyl titanate and 3.5 percent of polymethyl methacrylate. It was spun and the spun filaments calcined into TiO$_2$.

It will be appreciated that the instant specification and examples are set forth by way of illustration and not limitation, and that various modifications and changes may be made without departing from the spirit and scope of the present invention.

What is claimed is:

1. A process for making inorganic fibers from a liquid medium comprising dry spinning into an evaporative environment a solution or sol containing one or more inorganic fiber forming compounds selected from the group consisting of nitrates, sulfates, acetates, oxalates, formates, tartrates, and citrates chlorides and oxychlorides, or sols selected from the group consisting of hydroxide sols, oxide sols, phosphate sols, silicate sols, borate sols, tungstate sols and molybdate sols, which upon heating yield an oxide or carbide, of at least one element selected from the group consisting of Be, Mg, Ca, Sr, Ba, rare earths, Th, U, Ti, Zr, Hf, V, Nb, Ta, Cr, Mo, W, Mn, Fe, Co, Ni, Zn, B, Al, Ga, Si, Ge, Sn, Li, Na, K, Rb, Cs, Re, Ru, Os, Ir, Pt, Rh, Pd, Cu, Ag, Au, Cd, In, Tl, Pb, P, As, Sb, Bi, S, Se, and Te, said compounds being present in a concentration of about 5 percent to about 60 percent by weight, expressed as an oxide, and 0.01 to 5 percent by weight of a linear polymeric fiber-forming material having a degree of polymerization of at least about 2000 selected from the group consisting of olefin and diolefin polymers and copolymers, polyethers, polyphosphates, kurrol salts, polymers and copolymers of acrylamide, methacrylamide, methylmethacrylate, acrylonitrile, acrylic acid, methacrylic acid and their salts, polyvinylacetate, polyvinylalcohol, polyvinylmethylether and copolymers with maleic acid and their salts, the degree of polymerization and the amount of said polymeric fiber forming material being selected to produce a liquid medium having a viscosity of 1-100 poise and a degree of spinnability of at least 50 cm, and heating the dry spun fibers to a temperature sufficiently high to convert said inorganic fiber forming compound to an oxide or carbide.

2. A process according to claim 1, wherein the linear polymeric substance is selected from the group consisting of polyethylene oxide, kurrol salts, polyacrylamides, acrylamide-acrylic acid copolymers and their salts, polystyrene, polyisobutylene, poly-methyl methacrylate and polyisoprene.

3. Process according to claim 1, wherein the metal compound is a compound which decomposes readily under heat selected from the group consisting of nitrates, carbonates, sulfites, carboxylates and derivatives thereof, the solution, sol or dispersion is dry spun into a spinning column, and ammonia is fed into the spinning column during spinning.

4. Process according to claim 1, wherein the oxide or carbide is the oxide or carbide of at least one of Be, Mg, Ca, Ti, Zr, B, Al, P and Si.

5. Process according to claim 1, wherein the temperature of extrusion is about 15° to 60°C.

6. Process according to claim 1, wherein the linear polymeric substance comprises a polymeric kurrol salt of the composition (K,M)PO$_3$ with an inherent viscosity ln $\eta$ r/c of greater than about 15, M being at least one of Li, Na, Rb, Cs, NH$_4$ or a substituted ammonium ion, K = potassium.

7. Process according to claim 1, wherein the linear polymeric substance is a polyacrylamide, polymethacrylamide, polyacrylic acid and its salts, polymethacrylic acid and its salts, copolymers of acrylamide, acrylonitrile or methacrylamide and acrylic acid or methacrylic acid and their salts.

8. Process according to claim 1, wherein the linear polymeric substance is a polystyrene, polyisobutylene, polyvinylacetate, polyvinylalcohol, polyvinylmethylether, polymethylmethacrylate, or copolymers of styrene or methylvinylether and maleic acid and their salts.

9. Process according to claim 1, wherein the linear polymeric substance is a polybutadiene, polybutene-1 or a polyisoprene.

10. Process according to claim 1, wherein the linear polymeric substance is a polymerization product of ethylene oxide, propylene oxide and butylene oxide or a copolymer thereof.

11. Process according to claim 1, wherein said liquid medium has a spinnability in excess of about 10 cm.

12. Process according to claim 1, wherein the spinnable liquid medium contains as gaseous solvating agent at least one of CO$_2$, NO$_2$, SO$_2$, NH$_3$, H$_2$S, HF, HCl, HBr, or HI, which solvating agent volatilizes under the conditions of extrusion, thereby accelerating coagulation of the extrudate.

13. Process according to claim 7, wherein the linear polymeric substance is a polyacrylamide or an acrylamide/acrylic acid copolymer with an acrylic acid content of from 0 to 100 percent or its lithium, sodium, potassium, ammonium or substituted ammonium salts, the polymer having an inherent viscosity $\ln \eta\ r/c$ of greater than about 4.

14. Process according to claim 10, wherein the linear polymeric substance is polyethylene oxide, its limiting viscosity number $[\eta]$ being at least about 0.76.

15. Process according to claim 8, wherein the linear polymeric substance comprises polystyrene having a degree of polymerization in excess of about 10 000.

16. Process according to claim 8, wherein the linear polymeric substance comprises polyisobutylene having a degree of polymerization in excess of about 5 000.

17. Process according to claim 8, wherein the linear polymeric substance comprises polymethyl methacrylate.

18. Process according to claim 8, wherein the linear polymeric substance is polyisoprene having a degree of polymerization in excess of about 10 000.

19. Process according to claim 5, wherein the metal compound is, or upon treatment becomes, the oxide or carbide of at least one of Be, Mg, Ca, Ti, Zr, B, Al, P and Si, its concentration expressed as the oxide is about 5 to 60 percent by weight, the spinnability is in excess of about 10 cm, the solution, sol or dispersion contains about 0.01 to 2 percent by weight of the linear polymeric substance and it is dry spun at a temperature of about 15° to 60°C.

* * * * *